US005138873A

United States Patent [19]

Amano

[11] Patent Number: 5,138,873

[45] Date of Patent: Aug. 18, 1992

[54] THROTTLE VALVE OPENING DEGREE PROCESSING SYSTEM

[75] Inventor: Mitsuo Amano, Shizuoka, Japan

[73] Assignee: Jatco Corporation, Japan

[21] Appl. No.: 575,668

[22] Filed: Aug. 31, 1990

[30] Foreign Application Priority Data

Jun. 21, 1990 [JP] Japan ................................ 2-163455

[51] Int. Cl.5 ........................................ G01M 15/00

[52] U.S. Cl. ............................................ 73/118.1

[58] Field of Search ............... 73/118.1, 1 E; 340/438, 340/606, 686

[56] References Cited

U.S. PATENT DOCUMENTS 3,784,839 1/1974 Weber ................................ 361/172
4,665,385 5/1987 Henderson ........................... 73/23.3
4,893,501 1/1990 Sogawa ............................. 73/118.1
4,893,502 1/1990 Kubota et al. ...................... 73/118.1
4,901,561 2/1990 Glowczewski ..................... 73/118.1
4,930,079 5/1990 Kondo ............................... 73/118.1
4,951,206 8/1990 Kyohzuka .......................... 73/118.1
4,972,332 11/1990 Luebbering et al. ................. 73/488
4,989,451 2/1991 Ogawa et al. ...................... 73/118.1

*Primary Examiner*—Robert Raevis
*Attorney, Agent, or Firm*—Ronald P. Kananen

[57] ABSTRACT

The analog output of a throttle valve position sensor is A/D converted in an engine control unit and the digital signal is subject to a correction which corrects the position indicated by the signal to one which accurately reflects the position of the throttle valve. The corrected valve is then converted into a PWM signal and transmitted to a transmission control unit. The PWM signal is de-coded and used for transmission control purposes. If the position sensor malfunctions, the characteristics of the PWM signal under such circumstances reflects the improper operation thus enabling the transmission control circuit to issue a signal indicative of the situation. Only one line is required to transmit the data between the engine and transmission control units.

3 Claims, 4 Drawing Sheets

THROTTLE VALVE OPENING DEGREE PROCESSING SYSTEM

BACKGROUND OF THE INVENTION

1. Field of the Invention

The present invention relates generally to a control system such as used in connection with automotive engines and/or transmissions and, more specifically, to an arrangement for determining the opening degree of an engine throttle valve or the like type of control member.

2. Description of the Prior Art

Electronic control circuits for automatic automotive transmissions require the input of a signal indicative of the opening degree (position) of the engine throttle valve. In order to achieve this input, a throttle position sensor is operatively connected with the throttle valve and arranged to output a signal indicative of the position to an electronic control unit. An example of such an arrangement is shown in FIG. 5. This arrangement has been disclosed in Nissan Skyline Service Manual E-FR32 type, published by Nissan Motor Co. Ltd in March of 1989.

As shown in FIG. 5, this particular type of arrangement includes a sensor 50 which is arranged to output an analog signal. This signal is supplied to an engine control circuit 52 which includes an A/D converter 54 which converts the inputted signal to a digital form. The digital signal is supplied to a central processing unit (CPU) 56. The engine control circuit 52 further includes a voltage follower 58 which is connected to an A/D converter 62 forming part of a transmission control circuit 60. This A/D converter 62 is operatively connected with a central processing unit 64 which forms part of the control circuit 60 in a manner which permits the digital signal to be supplied thereto.

In this manner, both the engine and transmission control circuits are supplied with a signal indicative of the engine throttle valve opening degree.

However, this arrangement has suffered from the drawback that three connection lines between the two control circuits 52, 60 are necessary. Viz., in addition to the analog signal indicative of the throttle valve opening, a source of reference voltage and an earth connection are additionally necessary.

Further, in the event that the output of the throttle valve position sensor is subject to adjustment, both of the engine and transmission control circuits must also be adjusted. That is to say, when the throttle valve position sensor is fitted to the engine for example, due to unit deviation, it is necessary to adjust the system so that the output of the sensor accurately reflects the position of the throttle valve. For example, when an adjustment of the nature disclosed in JP-A-63-180755 is carried out, as both of the transmission and engine control circuits receive an analog output from the sensor 50, it is essential that both of the circuits be adjusted so as to both reflect the same positions. If this is not done, it is possible that the engine and transmission control circuits will take the same signal as indicating different throttle positions and give rise to the possibility that the proper coordination between engine torque control and the shifting and line pressure control in the transmission, for example, will not be achieved. This of course is apt to undesirably increase shift shock produced by the transmission.

SUMMARY OF THE INVENTION

It is an object of the present invention to provide a circuit arrangement wherein an analog signal is subject to a single A/D conversion and the digital signal is supplied in a predetermined signal form via a single line from the engine control circuit to the transmission control circuit.

In brief, this object is achieved by a circuit arrangement wherein the analog output of a throttle valve position sensor is A/D converted in an engine control unit and the digital signal is subject to a correction which corrects the position indicated by the signal to one which accurately reflects the position of the throttle valve. The corrected value is then converted into a PWM signal and transmitted to a transmission control unit. The PWM signal is de-coded and used for transmission control purposes. If the position sensor malfunctions, the characteristics of the PWM signal under such circumstances reflect the improper operation, thus enabling the transmission control circuit to issue a signal indicative of the situation. Only one line is required to transmit the data between the engine and the transmission control units.

More specifically, the present invention is provided in a control system for an automotive vehicle or the like and which features: a throttle position sensor, the throttle position sensor sensing the position of a throttle valve and outputting an analog signal indicative thereof; a first control circuit, the first control circuit comprising: an A/D converter which converts the analog signal from the throttle position sensor into a digital signal; correction circuit means for correcting the position indicated by the digital signal to indicate the actual position of the throttle valve; output circuit means which converts the corrected position into a pulse signal having a variable pulse width; and a second control circuit, the second control circuit comprising: decoding means for interpreting the pulse signal produced by the output circuit means.

DETAILED DESCRIPTION OF THE PREFERRED EMBODIMENTS

Figure 1:
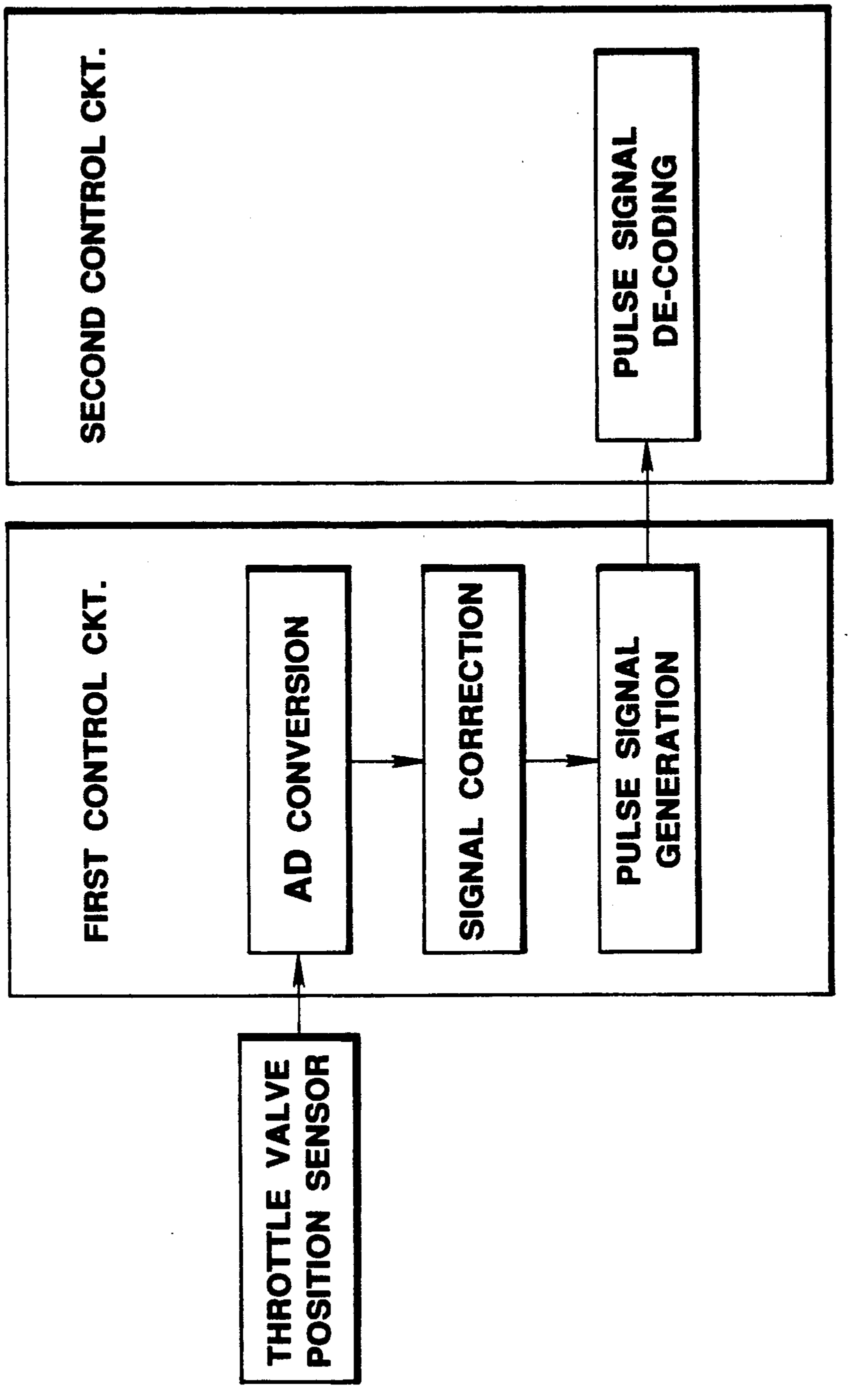
FIG. 1 is a block diagram showing the conceptual arrangement which characterizes the present invention.
Figure 2:
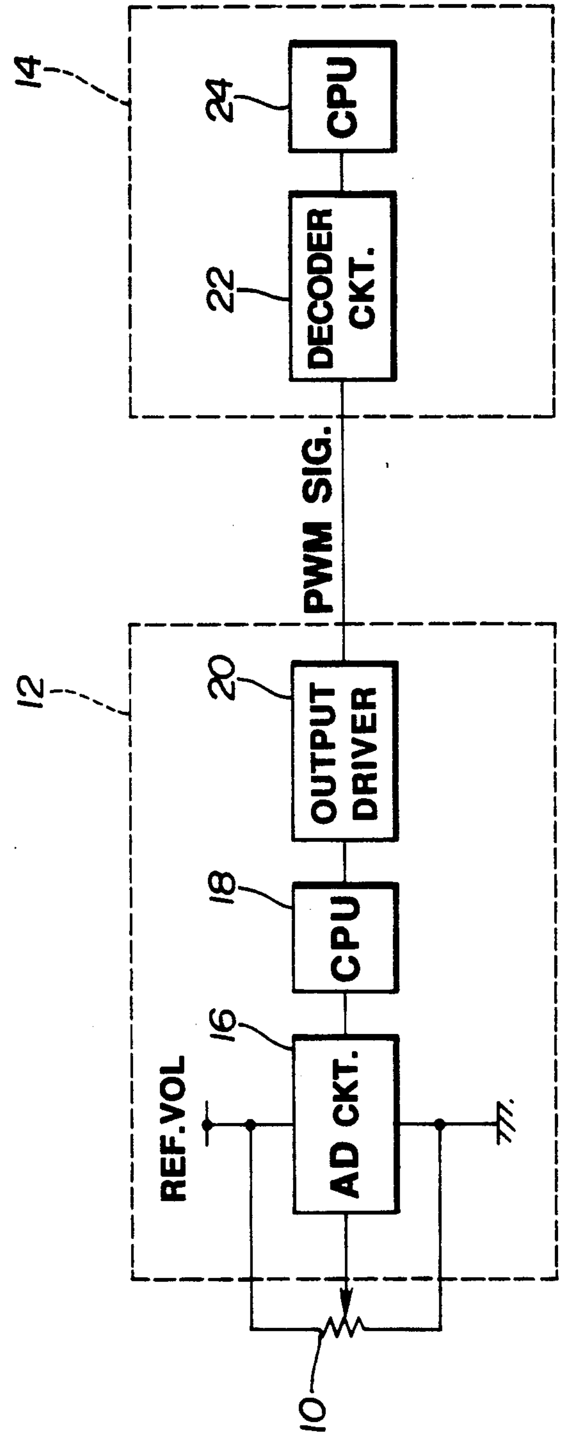
FIG. 2 is a block diagram showing the circuit arrangement which characterizes an embodiment of the present invention.
Figure 4:
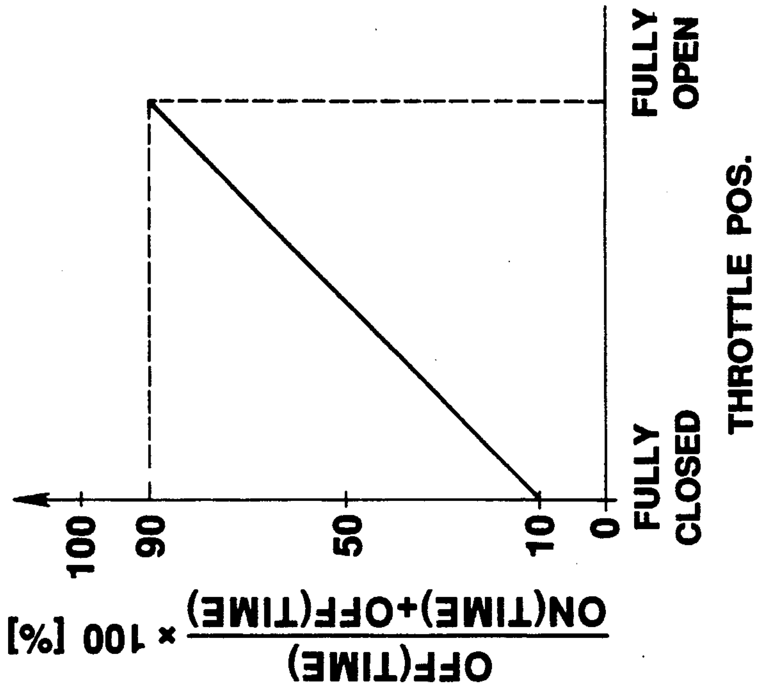
FIG. 4 is a chart which shows the relationship which exists between the PWM signal and the throttle opening degree.

FIG. 2 shows the circuit arrangement which characterizes an embodiment of the present invention. In this arrangement, a throttle valve position sensor 10 is operatively connected by way of an engine control circuit 12 to a transmission control circuit 14. In this case the sensor is of the potentiometer type and is connected to an A/D converter 16 included in the engine control circuit 12. A CPU 18 is connected to the A/D converter 16 in a manner to receive the digital output of the A/D converter 16, and to correct the same. An output driver circuit 20 is connected with the CPU 18 and arranged to convert an output from the CPU into a PWM signal. The latter mentioned signal is supplied to an input voltage conversion circuit 22 included in the transmission control circuit 14. The input voltage conversion (or decoder) circuit 22 is arranged to output a suitable digital signal to a CPU 24.

The operation of this arrangement is such that the analog output from the sensor 10 is A/D converted in the A/D converter 16 and supplied to the CPU 18. The CPU 18 further receives an input from a non-illustrated switch which is responsive to the throttle valve assuming a fully closed position and corrects the input in a manner similar to that disclosed in JP-A-63-180755 for example. During this correction, the throttle opening degree and a predetermined factor/are used to produce a corrected throttle valve position signal which is used for engine control purposes.

The output driver circuit 20 receives the corrected throttle valve position signal and converts the same to a PWM signal which is transmitted to the transmission control circuit 14. The input voltage conversion circuit 22 then supplies a suitable signal to the CPU 24 via which control the transmission is determined.

Figure 3:
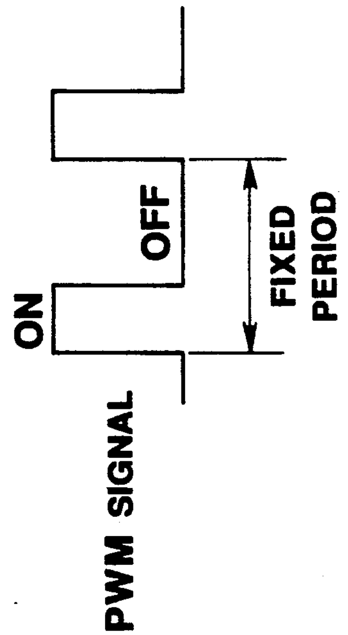
FIG. 3 is a diagram showing the characteristics of a PWM signal which is used in the embodiment of the present invention.
Figure 5:
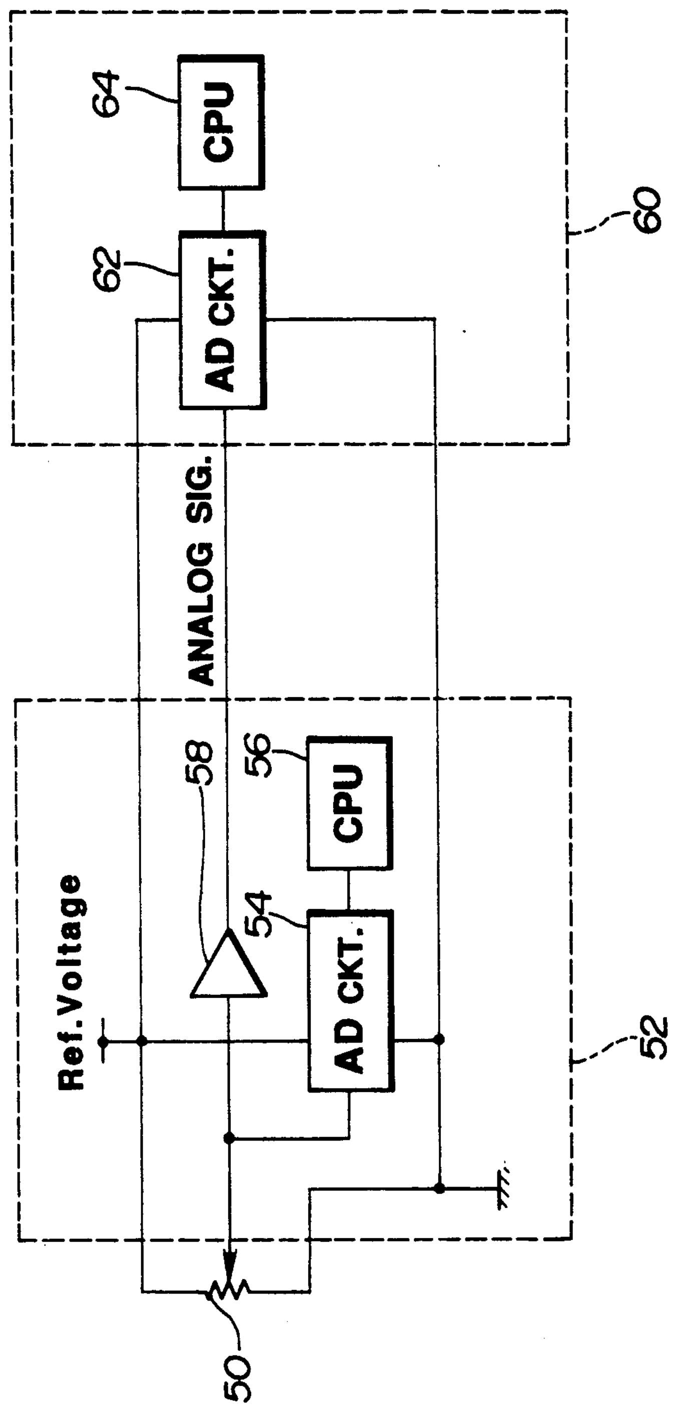
FIG. 5 (PRIOR ART)
FIG. 5 shows the prior art circuit arrangement discussed in the opening paragraphs of the instant disclosure.

It should be noted that the PWM signal is of the nature shown in FIG. 3 and features, predetermined period within which the ON/OFF ratio is varied. For example, when the ON time is set at 10% of the period, the throttle valve is indicated as being fully closed. On the other hand, when the ON time increases to 90% of the period, the throttle valve is indicated as being fully open. Based on this, as the ratio varies between 10% and 90%, the position of the throttle valve can be derived.

In this manner, the transmission control circuit 14 receives a signal which is representative of the corrected throttle valve position signal. Accordingly, the need to perform another signal correction is eliminated. Similarly, the chance is obviated that the engine control circuit will perform a control based on a throttle position which is different from the one for which the transmission control circuit is effecting control. In addition, only one connection line between the two control circuits 12, 14 is necessary and the effect of noise on the system is reduced.

In the event that the throttle position sensor malfunctions and the output remains constant at either a zero or a 100% value (for example), the CPU 18 induces the output of a signal which is outside the normal 10–90% ON ratio range whereby the CPU 24 can ascertain that the pulse width of the signal being supplied from the transmission control circuit 12 is abnormal and diagnose that the sensor 10 has malfunctioned.

What is claimed is:

1. In a vehicle control system including a throttle valve:

means for sensing an angular position of the throttle valve and generating an analog signal indicative of said sensed angular position;

means coupled to said sensing means for converting said sensed analog signal into a digital signal;

means coupled to said converting means for subjecting said digital siganl to a predetermined correction procedure and generating a corrected signal;

means coupled to said subjecting means for coding said corrected signal to a train of pulses;

means, including a transmission line having one end coupled with said coding means and an opposite end, for transmitting said train of pulses through said transmission line; and means coupled with said opposite end of said transmission line for decoding said train of pulses to said corrected signal;

whereby, with said signal transmission line, the corrected signal that is indicative of the angular position of the throttle valve is used at two remote locations interconnected by said transmission line.

2. A vehicle control system as claimed in claim 1, wherein said sensing means includes a potentiometer.

3. In a vehicle including a throttle valve, a control method comprising the steps of:

sensing an angular position of the throttle valve and generating an analog signal indicative of said sensed angular position;

converting said sensed analog signal into a digital signal;

subjecting said digital signal to a predetermined correction procedure and generating a corrected signal;

coding said corrected signal to a train of pulses at one location;

transmitting said train of pulses from said one location to another location; and decoding said train of pulses to said corrected signal at said another location.

* * * * *